United States Patent Office 3,505,978
Patented Apr. 14, 1970

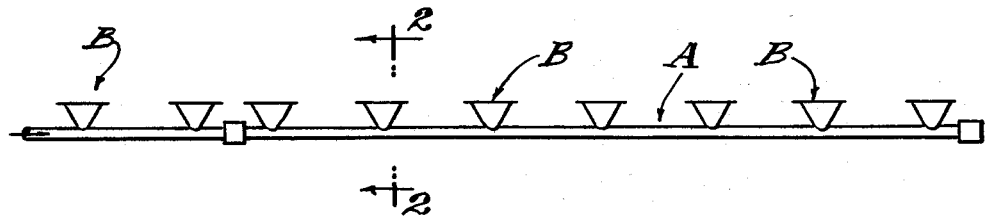
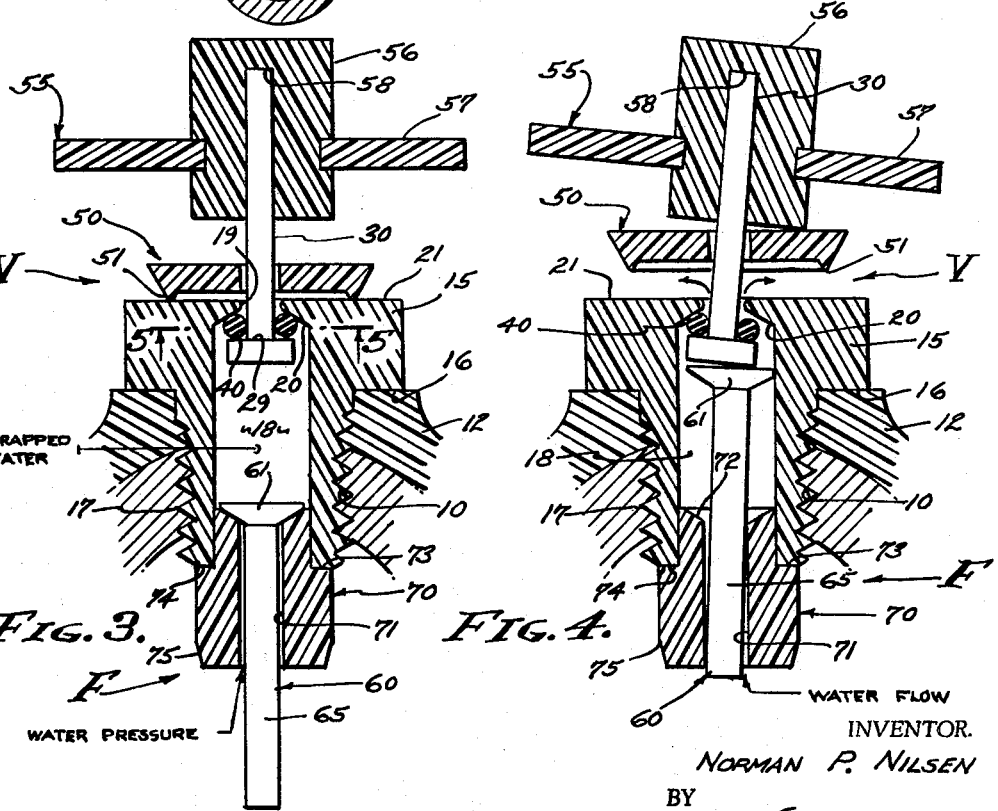

3,505,978
POULTRY OPERATED WATERER WITH BACK
FLOW CHECK MEANS
Norman P. Nilsen, P.O. Box 33, Phelan, Calif. 92371
Filed Sept. 11, 1967, Ser. No. 666,764
Int. Cl. A01k 7/00
U.S. Cl. 119—75                              10 Claims

ABSTRACT OF THE DISCLOSURE

This invention relates to the watering of poultry with a low pressure water supply and provides sanitary functions of filtering waterers supplied directly into the water and to check flow while providing a self-cleaning action and the resonant isolation of each waterer from the manifold from which it is supplied, the structure of this invention being incorporated in a valve body which serves to mount the waterer onto the manifold and to independently accommodate a waterer release valve and a self-cleaning back flow check valve.

This invention is especially concerned with Poultry Watering Apparatus of the type disclosed and claimed in my United States Letters Patent No. 2,921,556 issued Jan. 19, 1960, and with the cups of Self-Maintaining Poultry Waterer System such as disclosed and claimed in my United States Letters Patent No. 3,340,852 issued Sept. 12, 1967. The earlier of my two said patents discloses and claims an upwardly open vessel with its bottom in open communication with a water supply, and with a freely reciprocable element through the opening for manipulation by the poultry so as to keep the opening clear, a self-cleaning arrangement; and this older concept requires the complications of a level controlled water supply. The latter of my two said patents discloses and claims improvements in the same type of upwardly open vessels, or waterer cups, and has the improvement or advantage of eliminating the level controlled water supply, but with problems relating to vibration which required means suppressing resonant frequencies. However, the latter invention has as its primary disclosure and claimed subject matter the open vessel with its valve means adapted to be displaced laterally by the poultry thereby to misalign the valve and pivoting it upon a valve seal so as to admit water through a central port surrounding the said pin, the said open vessel and said valve means being employed with improvements therein in the practice of the present invention which additionally includes the cooperation therewith of an inherently operable mechanism having a number of functions including: back flow prevention filtration of the fines carried in the water supply, vibration isolation, and self-cleaning so as to prevent the accumulation therein of packed sedimentary materials and/or mineral deposits.

Poultry waterers have the ever-present problems of sanitation, insofar as hygiene of the fowl is concerned. Fundamentally, the natural and instinctive habits of the fowl must be met with and their habits are not conducive to cleanliness, and to the contrary measures must be taken to cope with and advantageously employ said natural habits and instinctive actions of the fowl. Therefore, it is a primary object of this invention to provide means in a waterer cup and valve therefor that promotes sanitary conditions through the prevention of back flow therefrom, through the filtration that prevents fines from passing therethrough and/or collecting therein, and through the isolation of the reservoir cup of the waterer from the water supply under pressure. It is significant that the multiplicity of functions herein referred to are accompanied in the provision of a single movable element and a fixed retainer therefor, and all of which renders the installation of the individual and entire waterer units extremely practical.

Concerning the back flow function of the present invention, it is important that water discharged into the open reservoir of a waterer cup be prevented from returning to its source, such as to the manifold from which it is supplied. Therefore, the mechanism herein disclosed operates as a check valve that permits passage of water into the cup reservoir and prevents return thereof. Consequently, the manifold supply for the waterer herein disclosed can be serviced and, for example periodically cleaned without disrupting operation of the waterer. Further, with the waterer cup and its poultry operated shutoff valve, pressure changes involved during servicing and cleaning of the manifold supply do not have adverse effect, due to the presence of the back flow check feature.

Concerning the filtration and self-cleaning function of the present invention, it is important that the alluvial bodies and minerals carried in the water supply do not accumulate so as to impair operation of the waterer. In practice, hundreds of waterer cup units are employed in a single installation, and it is imperative that maintenance be reduced to a minimum. Therefore, the self-cleaning function is highly advantageous and concerns itself with elimination of fines, regardless of the magnitude thereof. Consequently, large sized fines are excluded by virtue of the limited passage size involved, small sized fines are passed as inconsequential, and any accumulation of small sized fines and/or mineral deposits or corrosion are worked out and away by the repeated reciprocal motions of the single moving element that characterizes the present invention.

Concerning the vibration isolating function of the present invention, it is a requirement that the dynamics of the water supply have no effect that would impair operation of the many waterer units involved. In this respect, reference is made to hydraulic surges and resonant frequencies that will develop and cause malfunctioning of such waterer systems. With the mechanism of the present invention, the checking of reverse flow inherently isolates the poultry operated shutoff valve from the manifold pressure surges and/or resonant frequencies that from time to time occur. And, without inducement said surges and resonance will subside and will not be amplified.

The various objects and features of this invention will be fully understood from the following detailed description of the typical preferred form and application thereof, throughout which description reference is made to the accompanying drawings, in which:

FIG. 1 is an elevational view showing the waterers as they are installed upon a manifold. FIG. 2 is an enlarged sectional view taken as indicated by line 2—2 or FIG. 1. FIGS. 3 and 4 are enlarged sections of the water valves, shown in off and on conditions respectively, FIG. 3 showing the valves seated and FIG. 4 showing them unseated. And FIG. 5 is a transverse section taken as indicated by line 5—5 on FIG. 3.

Waterer units B are provided to be used in large numbers applied onto manifold pipes A. In practice, the manifold pipes A and waterer units B are associated with poultry pens, cages and yards wherein different levels are involved and there are variations in water pressures. The operative water pressures normally vary from 4 to 16 lbs. per square inch, and regardless of any pressure changes it is required that the waterers each maintain a constant normal level therein. Note that the manifolding need not be leveled and that there need be no float control for the manifold when practicing the present invention. Each waterer unit B is complete and operative in itself when applied to the manifold A to have its complete range of functions and all without adverse effect upon the remaining multiplicity of units B, however many there may be. At each waterer unit B there is a shutoff valve V operable by the natural habits and instinctive actions of the poultry, and there is a check valve filter F operable upon opening of valve V to have the functions hereinabove referred to. In practice the manifold A is comprised of a pipe with like or identical and equally spaced upwardly faced openings 10 displaced in a common plane. The openings 10 are threaded on parallel axes normal to and intersecting the axis of the manifold pipe. Thus, there is a plurality of like openings equally spaced along one side of the manifold pipe, the upper side.

The cups at each waterer unit B are alike or identical and are provided to receive and to dispense water from the manifold A, and each is a vertically disposed vessel shaped part open at its top 11 and provided with a ported bottom 12 concaved for engagement on and in communication with the manifold. The cup is a cone-shaped part with outwardly flared side walls 13 that terminate at the top 11, the top being in the form of a flat horizontally disposed peripheral flange. In practice, the top 11 is approximately three inches in diameter and tapers inwardly toward the bottom 12 approximately one inch in diameter. This particular configuration has been found to be successful in serving chickens, the cup being a molded plastic material or the like.

The shutoff valve V couples the cup of the waterer unit B to the manifold A and in controlled communication with the interior of said manifold. The valve V has a body 15 in the nature of the coupler having a shoulder 16 to clamp downwardly upon the top side of the bottom 12, and having a threaded depended cylindrical wall 17 threadedly engaged with the opening 10. Thus, the valve body 15 clamps the cup in working position on the top side of the manifold pipe, with sealed engagement by virtue of the plasticity in said body 15.

The body 15 of the valve V is fashioned to cooperatively carry the valve parts which control the supply of water to the cup. Functionally, it is desired that the cup be automatically and quickly filled to ½ or ¾ its height when fluid pressure is initially supplied to the system, and that only the fowl in drinking therefrom reduce that level before the cup is again refilled. And, these functions are automatic and inherent in the valve V which involves, generally, a valve seat 20, a valve pin 30, a valve seal 40, a baffle 50, and an actuator 55. The assembly of parts which forms the valve V is characterized by the valve pin 40 extending loosely through the body 15 and thereby capturing the seal 40 and baffle 50 in operating position relative to the body. The actuator 55 is applied onto the valve pin 40 in a manner to hold the valve parts in the assembled condition.

The body 15, as hereinabove described, is a cylindrical part that is threaded into the manifold A to clamp the cup in operative position. Further, the body 15 functions as a duct for delivery of water from the manifold into the cup, and to this end has an opening therethrough. As shown, the opening through said body comprises an elongated cylindrical chamber 18 of substantially greater cross section than the valve part that operates therein, and so that said part is free to move laterally therein. In practice, the chamber 18 is established as by drilling on an axis concentric with the body 15. In accordance with the invention the valve seat 20 is formed as by the angular leading cutting edges of a drill, preferably disposed at a 30° angle extending inwardly to a central discharge port 19 that opens at the top 21 of the body. Again, the port 19 is of such diameter as to pass the valve part extending therethrough with substantial clearance, and the annular valve seat 20 immediately underlies the top 21 and adjoins said top at the relatively sharp corner or minimum radius, as shown. Also, the top 21 is a flat smooth surface disposed in a plane normal to the longitudinal axis of the body 15.

The valve pin 30 is a straight shaft-like part adapted to enter into the cylindrical chamber 18 from above the top 21, to be operated by the actuator 55 and to operate the valve seal 40 relative to the valve seat 20. The valve seat 20 faces downwardly at the top of the chamber 18 while the valve pin 30 depends into the chamber through the port 19, where it has an annular shoulder 29 that opposes the seat 20. That is, the outer diameter of the shoulder 29 is substantially greater than the inner diameter of the port 19. Thus, the valve pin 30 presents a straight and upstanding shaft-like part that normally extends along the axis of the body 15 projecting through the port 19 with clearance so as to permit a rocking movement to be described.

The valve seal 40 is an annular part that surrounds the valve pin 30 and is captured in working position between the valve seat 20 and shoulder 29. In accordance with the invention the valve seal 40 and valve pin 30 are biased against the valve seat 20 entirely by water pressure within the chamber 18, and in order to have sealing engagement the seal has a rim that has circular engagement with the said seat 20. In its preferred form the seal 40 is an O-ring that closely and/or frictionally surrounds the valve pin 30 to be carried with the pin in engagement with the shoulder 29. Thus, the sealing rim is the outer and upper quarter peripheral face of said O-ring. In accordance with the invention, the outer diameter of the valve seal 40 is substantially smaller than the inner diameter of chamber 18 surrounding the valve seat 20, in order to establish a flow restricting passage of annular configuration. And, as a result of the valve seat and valve seal closeness hereinabove described there is a lifting and centering action as water expells upwardly through the annular orifice existing between the valve seat 20 and valve pin 30, as well as a centering action when the valve seal 40 engages on the cone-shaped valve seat 20. As a result, the valve pin 30 is biased and centered as and when water pressure is applied.

The baffle 50 is a plate-like part that slips over the valve pin 30 to overlie the top 21 of the body 15. In practice, the baffle 50 is a disc of plastic material adapted to seal with the top 21 when engaged therewith and to diffuse water discharged when valve V is opened. To this end the baffle 50 has a downwardly disposed peripheral lip 51 that engages the top 21 along a line of contact circumscribing the port 19. In practice, the said slip fit permits the baffle 50 to drop freely onto the top 21, and alternately to lift off the top when flow of water occurs. Normally, however, the baffle drops by gravity and engages the top 21 so as to preclude the downward precipitation of particles to the port 19.

The actuator 55 is provided for pivoting the valve pin 30 and valve seal 40 carried thereby, the fulcrum of said pivotal movement being the peripheral engagement of rim 41 on the valve seat 20. Therefore, the actuator 55 is adapted to cause displacement of the valve pin 30 from a normal position aligned with the axis of body 15 to an angularly disposed position, and involves a head 56 at the upper end of the valve pin 30 to be pecked at end/or nudged laterally so as to cause momentary misalignment of the valve pin. In practice, the actuator head 56 carries an extensive flange 57 that overlies and protects the entire valve V, the flange being a disc that is normally disposed in a plane parallel to the top 21 and with its periphery terminating short of and concentric with the wall 13 of the cup. As shown, the head 56 is provided with a blind bore 58 pressed onto the valve pin 30 so as to have a stopped location thereon, and the flange 57 is a separate part snapped into a groove formed externally in the head. Axial movement for pivoting of the valve is provided for by substantial clearance between the actuator head 56 and baffle 50, as shown.

The check valve filter F provides the protective functions hereinabove referred to and which enables the shutoff valve V to be reliable in its operation. The check valve filter F involves the body 15 and establishes a releasable closure for the cylindrical chamber 18 therein, in open communication within the pipe of manifold A. In accordance with the invention, the check valve filter F involves but two parts, a movable poppet 60 and a fixed retainer 70. The poppet 60 is reciprocably operative as a result of water flow through the chamber 18 and when seated upon the retainer 70 water is entrapped within the said chamber. It is the cylindrical chamber 18 in which the poppet 60 is operable to be lifted by the dynamics of liquid flow and to be returned to a seated position by gravity when conditions are static.

In accordance with the invention, the poppet 60 involves a valve head 61 and a depending filter rod 65. The valve head 61 is disc-shaped with a flat top and a conical bottom face. The filter rod 65 is integral with the head and is a straight shaft of round cross section and of sufficient length to remain embraced within retainer 70. The filter rod 65 is preferably of small diameter, the head 61 being of substantial diameter and somewhat larger than that of the annular shoulder 29 of the pin 30, both operable within the chamber 18, and so that the remaining annulus surrounding the check valve filter is less than that surrounding the shutoff valve V.

The retainer 70 is fixed in the body 15 upon assembly and provides for closing the chamber 18 upon seating of the poppet 60 therewith. As shown, the retainer has a concentric water passage 71 through which the filter rod 65 operates, and has an upwardly faced conical seat 72 to engageably receive the face 63 of the poppet. Passage 71 is preferably of greater diameter than the filter rod 65, in the same amount as the chamber diameter is greater than the poppet head 61, thereby having equal capacity to pass fines. Thus, the poppet 60 is loosely captured to operate reciprocally in the chamber 18, to strike upwardly upon initial liquid motion to acquire random misalignment when raised free of the seat 72, and to return to alignment centered upon the seat 72 when liquid motion ceases. In practice, the retainer 70 is made of plastic material as is the body 15, and the two parts 70 and 15 are pressed together to have sealed engagement by virtue of the plasticity in said two parts. Therefore, retainer 70 is provided with an upwardly disposed shoulder 73 having stopped engagement with the bottom 74 of body 15. A feature of the retainer 70 is its cylindrical body 75 that depends from bottom 74 and having a diameter slightly less than the minor diameter of the threads in manifold opening 10. Consequently, the body 75 serves the function of a pilot and which is extremely helpful when employing plastic parts such as body 15 and in most instances plastic pipe in the manifold A.

From the foregoing it will be apparent that a very practical arrangement of few and simple parts characterizes the present invention. The waterer units B are automatically filled when the pressure is initially applied so as to close the valve V by the application of fluid flow. The filled waterer cups require no learning to drink on the part of the fowl and present automatically full reservoirs of water from which the fowl naturally drink without being taught to do so. Each waterer unit is independently operable in establishing its own plentiful water level to automatically fill and to maintain the same approximate level. The fowl displaces the actuator 55 and attached value pin 30 moving the same so as to pivot the valve seal 40 on the valve seat 20, and as a result the water gushes forth freely and lifts the baffle 50 to enter the cup. The refilling of the cup is in each instance momentary, and is accompanied by the percussive movement of the check valve filter F which strikes upwardly upon each initiation of liquid flow through the chamber 18. Consequently, the filter rod 65 strikes the pin 30, and it is because of this impingement that the head 56 is provided with the blind bore 58 for its positive placement upon the pin 30. Misalignment of the filter rod 65 will occur while water continues to flow therethrough, in an angular direction dependent upon what direction the fowl tips the pin 30. Thus, upon release of the fowl, shut-off valve V closes the upper end of chamber 18 and thereby stops the delivery of water therethrough and so that the poppet 60 drops onto the retainer seat 72. As a result, a body of water is entrapped within the chamber 18 and isolated from both the source within manifold A and from the supply delivered into the waterer cup. The reciprocal movement and misalignment of the filter rod 65 has its function of scrubbing away any collection of foreign materials, while its poppet valve action is operative with the shutoff valve V to create an entrapped body of water with the consequent isolation of the waterer cup unit B from the supply manifold A.

Having described only a typical preferred form and application of my invention, I do not wish to be limited or restricted to the specific details herein set forth, but with to reserve to myself any modifications or variations that may appear to those skilled in the art.

Having described my invention, I claim:

1. A poultry waterer unit for dispensing water from a pressured supply thereof and comprising, an upwardly open vessel having a side wall of substantial vertical extent for the containment of a water level therein, a valve body with a chamber therethrough and having a passage opening into the water supply and having a port opening into the vessel, a shutoff valve normally closing the port into the vessel and operable through engagement by the poultry to open and thereby increase the water level, and a check valve permitting entry of water into said chamber and normally closing said passage opening into the water supply, said chamber entrapping a body of water between and when the two valves are closed and thereby isolating the water supplied into the vessel from the pressured supply thereof.

2. The poultry waterer unit as set forth in claim 1 and wherein the said check valve comprises, a poppet operable to lift into the chamber with the water flow therethrough, and a retainer fixedly positioned in the chamber and with a passage surrounded by a seat engageably receiving the poppet to close the chamber.

3. The poultry waterer unit as set forth in claim 1 and wherein the said check valve comprises, a poppet with a filter rod depending therefrom and operable to lift into the chamber with the flow of water therethrough, and a retainer fixedly positioned in the chamber and with the passage therein and opening into the water supply and accommodating the filter rod with freedom to move therein and pass water, and said passage being surrounded by a seat faced into the chamber and engageably receiving the poppet to close the chamber.

4. The poultry waterer unit as set forth in claim 1 and wherein the said check valve comprises, a poppet having annular clearance within the chamber and with a filter rod depending therefrom and operable to lift into the chamber with the water flow therethrough, and a retainer fixedly positioned in the chamber and with the passage therein and having annular clearance over the filter rod and opening into the water supply, and said passage being surrounded by a seat engageably receiving the poppet to close the chamber, said annular clearances establishing the magnitude of the fines excluded by the poppet and by the filter rod.

5. The poultry waterer unit as set forth in claim 1 and wherein, the said shutoff valve comprises, a valve pin extended loosely into the body chamber, there being an annular valve seal carried on the lower end of the valve pin and biased by said pressured water supply into seated engagement with the body in the chamber surrounding the port therein and adapted to rock into the chamber for disengagement, and wherein the said check valve comprises, a poppet operable to lift into the chamber with the flow of water therethrough, and a retainer fixedly positioned in the chamber and with a passage surrounded by a seat engageably receiving the poppet to close the chamber.

6. A poultry waterer unit for dispensing water from a pressured supply thereof and comprising, an upwardly open vessel having a side wall of substantial vertical extent for the containment of a water level therein and having a bottom ported for the reception of water, and shutoff valve means for controlling the admission of water into the vessel through said ported bottom and including, a valve body at said bottom of an extending upwardly into said vessel and spaced from said side wall and having a cylindrical chamber with a downwardly faced valve seat therein above said bottom of the vessel surrounding a discharge port into said vessel and with an upwardly faced valve seat therein surrounding an opening into the water supply and spaced downward from the first mentioned valve seat, said first mentioned valve seat terminating substantially adjacent a top portion of the valve body, a valve pin extended into the body loosely through said port, there being an annular valve seal carried on the lower end of the valve pin and biased by said constant pressure supply into engagement with the first mentioned valve seat to close the port, and the upper end of the valve pin being exposed and adapted to be displaced laterally by the poultry thereby to misalign the valve pin and pivoting one peripheral side of the valve seal on the first mentioned valve seat and lifting the other peripheral side of the valve seal so as to admit water to the vessel through said port, and a check valve normally engaged upon the second mentioned valve seat closing said opening into the water supply entrapping water in the body chamber when the two valves are closed and thereby isolating the water supplied into the vessel from the pressured supply thereof.

7. The poultry waterer unit as set forth in claim 6 and wherein the said check valve comprises, a poppet operable to lift into the chamber with the water flow therethrough, and a retainer fixedly positioned in the chamber and with a passage surrounded by the said second mentioned valve seat engageably receiving the poppet to close the chamber.

8. The poultry waterer unit as set forth in claim 6 and wherein the said check valve comprises, a poppet with a filter rod depending therefrom and operable to lift into the chamber with the flow of water therethrough, and a retainer fixedly positioned in the chamber and with a passage opening into the pressured water supply and accommodating the filter rod with freedom to move therein, and said passage being surrounded by the said second mentioned valve seat engageably receiving the poppet to close the chamber.

9. The poultry waterer unit as set forth in claim 6 and wherein the said check valve comprises, a poppet having annular clearance within the chamber and with a filter rod depending therefrom and operable to lift into the chamber with the water flow therethrough, and a retainer fixedly positioned in the chamber and with a passage having annular clearance over the filter rod and opening into the pressured water supply, and said passage being surrounded by the said second mentioned valve seat engageably receiving the poppet to close the chamber, said annular clearances establishing the magnitude of the fines excluded by the filter rod.

10. The poultry water unit as set forth in claim 6 and wherein, the said shut-off valve comprises, a valve pin extended loosely into the body chamber, there being an annular valve seal carried on the lower end of the valve pin and biased by said pressured water supply into engagement with the said first mentioned valve seat in the chamber surrounding the port therein and adapted to rock thereon for disengagement, and wherein the said check valve comprises, a poppet operable to lift into the chamber with the flow of water therethrough, and a retainer fixedly positioned in the chamber and with a passage surrounded by the said second mentioned valve seat engageably receiving the poppet to close the chamber.

References Cited

UNITED STATES PATENTS

| 326,829 | 9/1885 | Balch | 119—75 |
| 1,646,246 | 10/1927 | Hazard | 119—75 |
| 1,808,074 | 6/1931 | Rike et al. | 137—614.2 |
| 2,271,419 | 1/1942 | Egan | 137—614.2 X |
| 2,319,928 | 5/1943 | Hart | 119—75 |

HUGH R. CHAMBLEE, Primary Examiner